United States Patent
Cornolti

(10) Patent No.: US 6,722,476 B1
(45) Date of Patent: Apr. 20, 2004

(54) CALIPER FOR A DISK BRAKE FOR A HIGH-PERFORMANCE MOTORCAR

(75) Inventor: Raffaello Cornolti, Bergamo (IT)

(73) Assignee: Freni Brembo S.p.A., Curno (IT)

( * ) Notice: Subject to any disclaimer, the term of this patent is extended or adjusted under 35 U.S.C. 154(b) by 0 days.

(21) Appl. No.: 10/088,203

(22) PCT Filed: Oct. 20, 2000

(86) PCT No.: PCT/EP00/10339

§ 371 (c)(1),
(2), (4) Date: Mar. 15, 2002

(87) PCT Pub. No.: WO01/31224

PCT Pub. Date: May 3, 2001

(30) Foreign Application Priority Data

Oct. 26, 1999 (EP) .............................................. 99830673

(51) Int. Cl.⁷ ............................................. F16D 65/853
(52) U.S. Cl. ............ 188/71.6; 188/73.47; 188/264 CC; 188/264 F; 188/264 D
(58) Field of Search ............................. 188/71.6, 73.47, 188/264 R, 264 D, 264 F, 264 CC, 264 P; D12/180

(56) References Cited

U.S. PATENT DOCUMENTS

| | | | |
|---|---|---|---|
| 5,394,963 A | * | 3/1995 | Deane et al. ............. 188/73.31 |
| 5,445,242 A | | 8/1995 | Pogorzelski et al. |
| 5,558,183 A | | 9/1996 | Way |
| 6,321,880 B2 | * | 11/2001 | Nakamura ................. 188/71.6 |
| 6,446,766 B1 | * | 9/2002 | Cornolti et al. ............. 188/71.6 |

FOREIGN PATENT DOCUMENTS

| | | |
|---|---|---|
| EP | 0 905 404 A1 | 3/1999 |
| JP | 8-226466 | * 9/1996 |

* cited by examiner

Primary Examiner—Jack Lavinder
Assistant Examiner—Bradley T. King
(74) Attorney, Agent, or Firm—Hogan & Hartson LLP

(57) ABSTRACT

A caliper for disk brakes for high-performance cars, which has a high degree of reliability, comprises a body having two side portions and two transverse bridges connecting the two side portions, cylinder-piston units arranged along each side portion, and a circuit for a fluid for cooling the cylinder-piston units, the circuit comprising wells which are formed along the side portions and are of a depth such that they extend substantially as far as the wall delimiting the cylinder-piston units, and which are closed by covers, the circuit also comprising connecting ducts between adjacent wells.

20 Claims, 6 Drawing Sheets

CALIPER FOR A DISK BRAKE FOR A HIGH-PERFORMANCE MOTORCAR

BACKGROUND OF THE INVENTION

The present invention relates to a caliper for disk brakes for motorcars, particularly high-performance cars, of the type comprising a body having two side portions and two transverse bridges connecting the two side portions, cylinder-piston units arranged along each side portion, and a circuit with an inlet and an outlet for a fluid for cooling the cylinder-piston units.

As is known, in calipers of the type specified, it is necessary to cool the cylinder-piston units so that the braking fluid does not reach excessively high temperatures which would lead to boiling of the braking fluid and consequently to loss of braking efficiency.

In known calipers, although the circuits for the cooling fluid used up to now for preventing the braking fluid from reaching excessively high temperatures are substantially satisfactory, they have recognized disadvantages.

For example, there are known calipers which have cooling-fluid circuits constituted by ducts formed in the caliper body during casting. These ducts extend along the side portions of the caliper and their path extends past the walls of the cylinder-piston units. However, this known solution requires the caliper bodies to be produced by casting with the disadvantage of structural complexity of the body.

Calipers which have fluid ducts, particularly air ducts, which extend along the cylinder-piston units in the vicinity of the region of contact with the braking pads have also been proposed. However, this latter solution is penalized by the poor heat-removal capacity typical of air, and requires very large ducts.

The technical solution of fitting, on the caliper body, elements having ducts through which a cooling liquid, rather than air, is intended to flow, however, have the disadvantage of requiring dimensions which are notably large, although smaller than those of solutions in which the cooling fluid is air.

SUMMARY OF THE INVENTION

The problem upon which the present invention is based is therefore to devise a caliper of the type specified which has structural and functional characteristics such as to satisfy the above-mentioned need to cool the cylinder-piston units, at the same time overcoming the disadvantages mentioned with reference to the prior art.

This problem is solved by a caliper of the type specified which is characterized in that the circuit for the fluid for cooling the cylinder-piston units comprises wells formed along at least one of the side portions, the wells being of a depth such that they extend substantially as far as the vicinity of the wall delimiting at least one of the cylinder piston units, and the wells being closed by covers, the circuit also comprising connecting ducts for putting the wells into fluid communication with one another.

BRIEF DESCRIPTION OF THE DRAWINGS

Further characteristics and the advantages of the caliper according to the present invention will become clear from the following description of embodiments thereof given by way of non-limiting example and illustrated in the appended drawings, in which.

DETAILED DESCRIPTION OF THE PREFERRED EMBODIMENT

Figure 1:
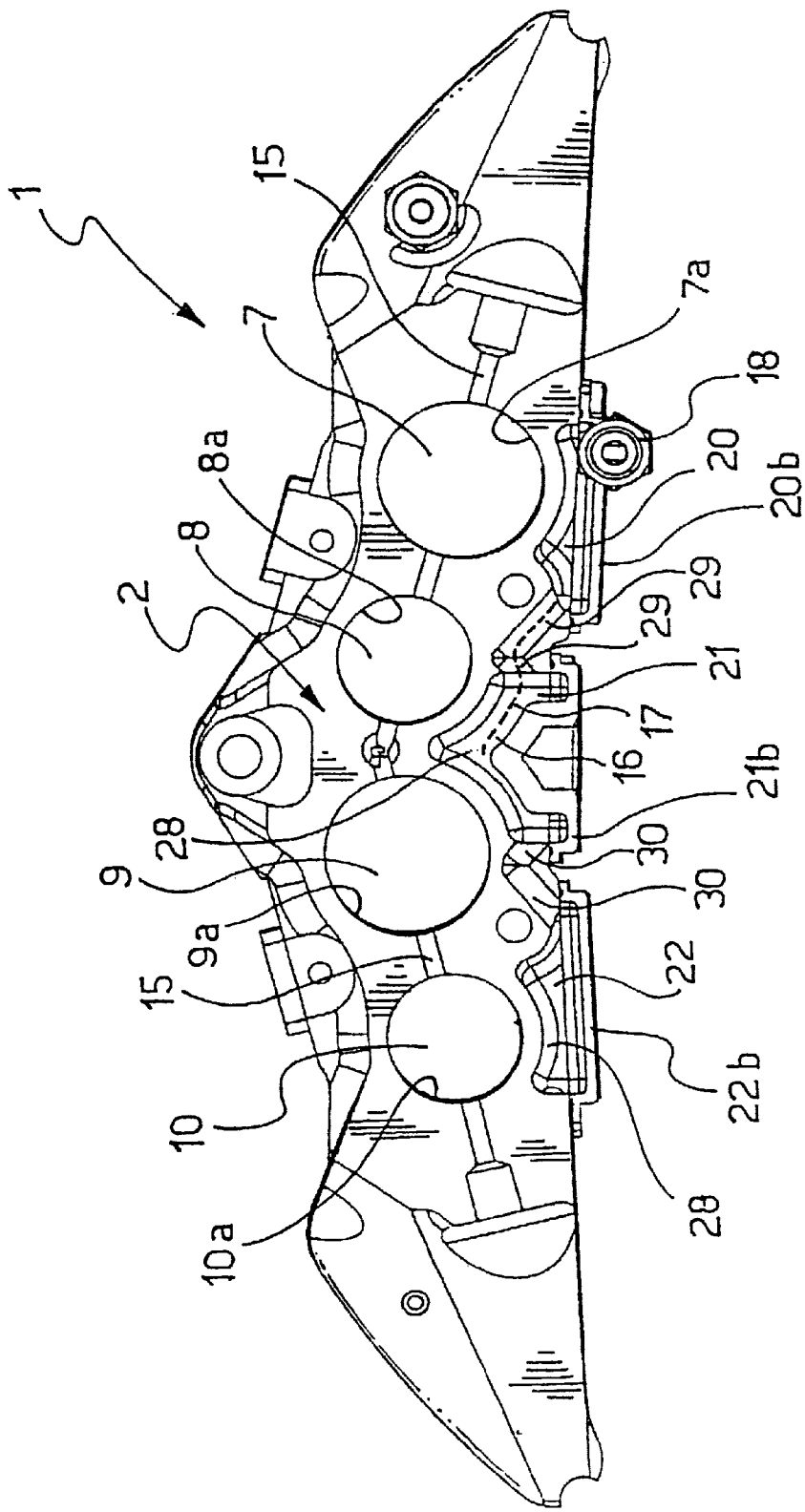
FIG. 1 is a view showing a first embodiment of the caliper according to the invention, in longitudinal section.
Figure 2:
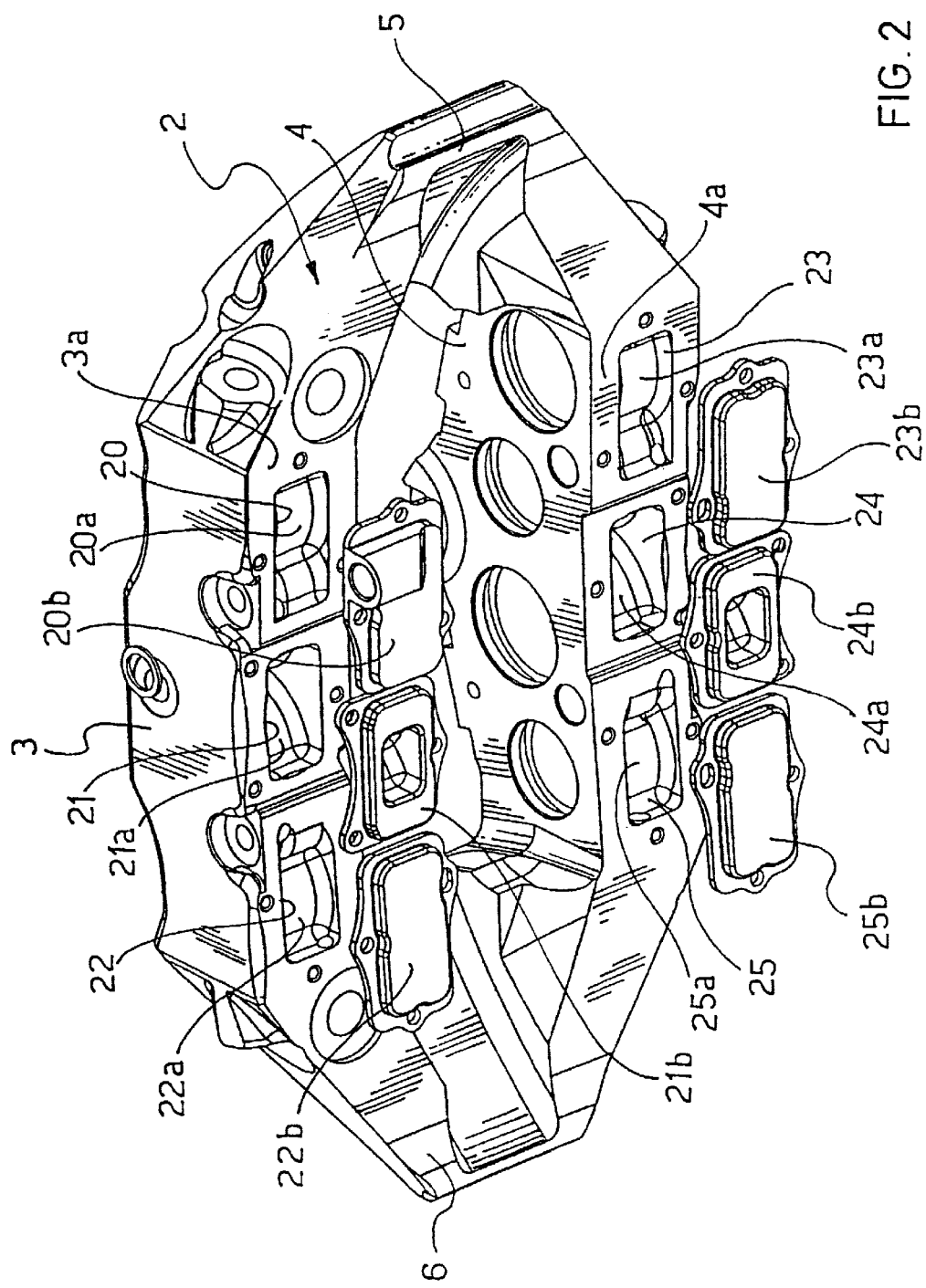
FIG. 2 is a perspective view of the caliper of FIG. 1 with parts separated, viewed substantially from below and from the rear.
Figure 3:
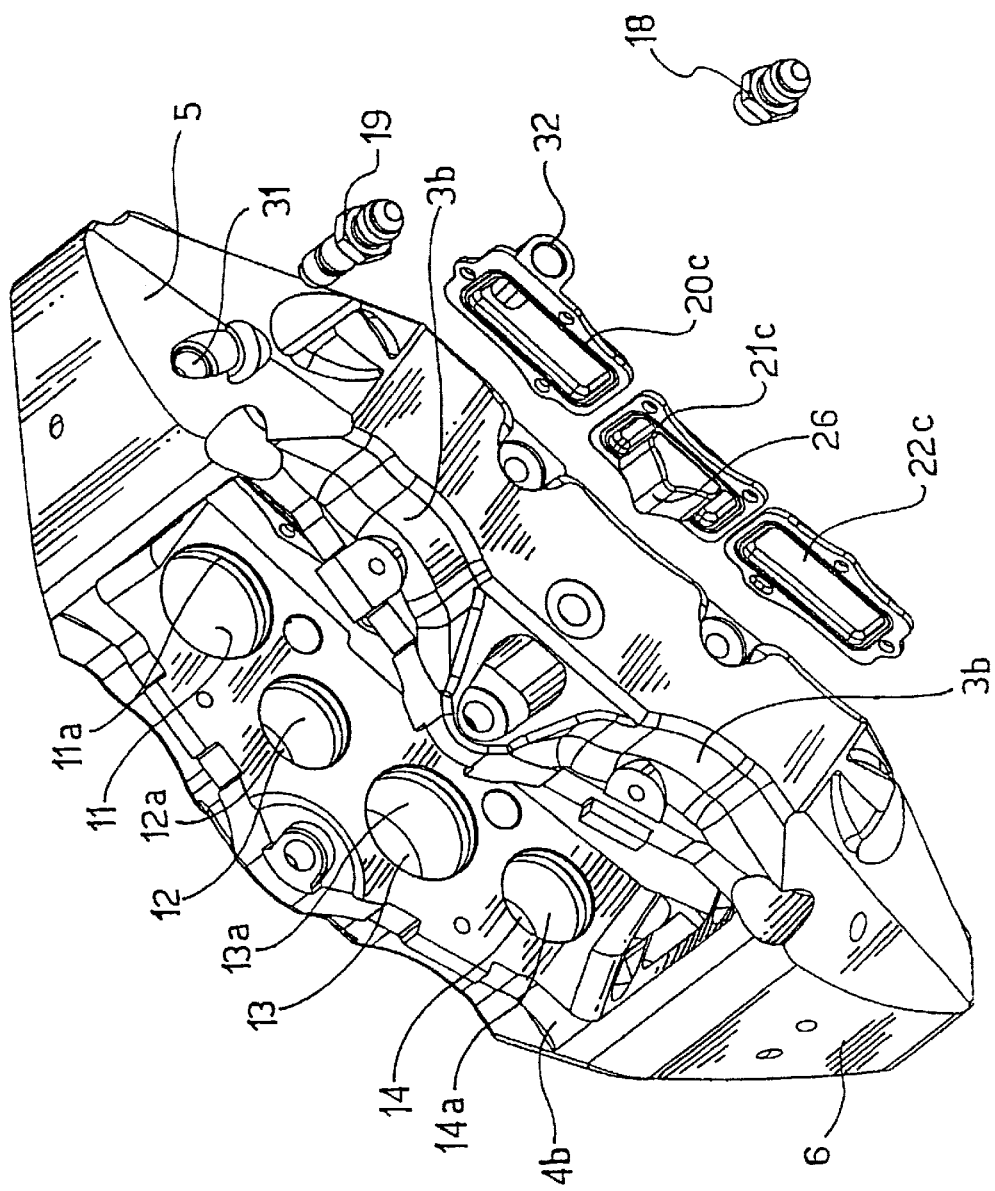
FIG. 3 is a perspective view of the caliper of FIG. 1 with parts separated, taken from above and from the rear.
Figure 4:
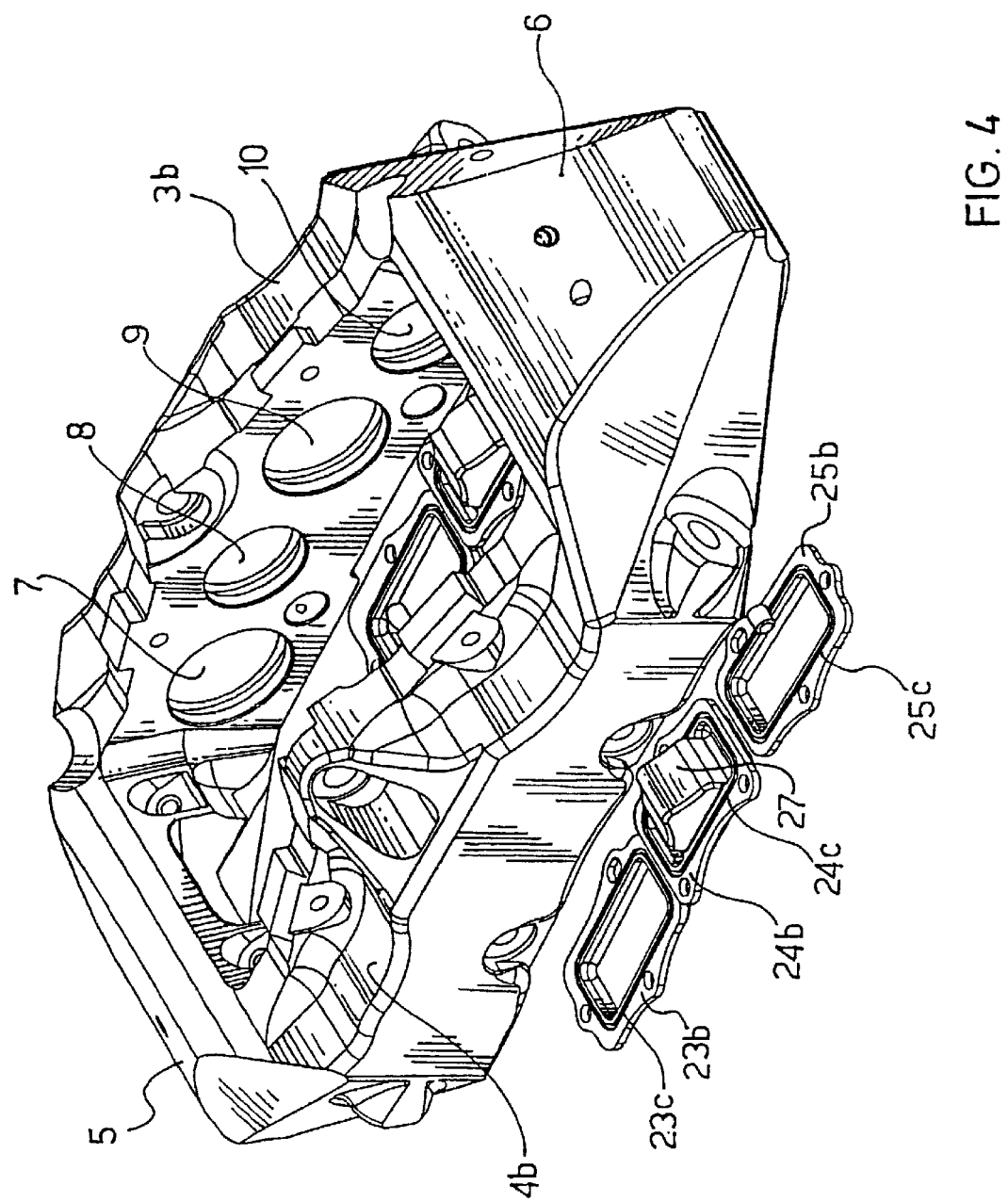
FIG. 4 is a perspective view of the caliper of FIG. 1, with parts separated, taken from above and from the front.

With reference to the appended drawings, a caliper for a disk brake intended for a motorcar in general and for a high-performance motorcar in particular, is generally indicated 1.

The caliper 1 comprises a body 2 produced by machining from a solid semi-finished product, for example, from a rolled piece or from a forging of a suitable aluminium alloy known per se.

The body 2 has opposed elongate side portions 3 and 4 which are intended to be arranged along opposed sides of a braking band of the disk of a disk brake, not shown in the drawings.

The side portion 3 is disposed on the inner side and the side portion 4 is disposed on the outer side of the disk, in conventional manner.

Each of the side portions 3 and 4 has a lower peripheral wall 3a, 4a and an upper peripheral wall 3b, 4b.

Two transverse connecting bridges 5 and 6 connect the two side portions 3 and 4 to one another at their respective ends and on the side with the peripheral walls 3b and 4b. These connecting bridges 5 and 6 extend over the braking band of the disk.

The caliper 1 is of the fixed type and is intended to be fixed to an axle of the motor vehicle in conventional manner.

Cylinder-piston units are arranged along each of the two side portions 3 and 4. In the embodiment illustrated, four cylinder-piston units 7, 8, 9 and 10 are disposed in the side portion 3 and four cylinder-piston units 11, 12, 13 and 14 are disposed in the side portion 4.

The respective cylindrical seat of the cylinder of each cylinder-piston unit 7–14 in which the respective piston, not shown, can slide, is indicated 7a–14a.

A fluid circuit 15 for a braking fluid supplies all of the cylinder-piston units in conventional manner known per se.

According to the present invention, the caliper 1 comprises a fluid circuit 16 for a cooling fluid, for example water, which is provided for cooling the cylinder-piston units 7–14 and, more precisely, for cooling the braking fluid operating therein, in order to avoid the danger of boiling of the braking fluid.

The fluid circuit 16 for the cooling fluid has a path 17 which extends between two connectors 18 and 19 which constitute the inlet and the outlet for the cooling fluid.

Wells are formed in the lower walls 3a and 4a of the side portions 3 and 4, preferably by mechanical milling with machine tools. More precisely, according to the embodiment shown in FIGS. 1–4, three wells 20, 21, 22 and 23, 24, 25, respectively, are formed in each side portion 3 and 4, each in a position between respective adjacent cylinder-piston units.

Each well 20–25 has a substantially cusp-shaped end 20a–25a fitted between the respective adjacent cylinder-piston units so that the ends 20a–25a of the wells are close to the walls delimiting the cylindrical seats 7a–14a and hence are in a good heat-exchange relationship therewith.

The wells 20–25 are closed in a leaktight manner by respective covers 20b–25b, for example, by means of conventional screws, or by snap-closure means, or even by gluing, leaktightness being ensured by respective seals 20c–25c.

The well 21 and the well 24, which are deeper, are closed by the covers 21b and 24b. These have appendages 26 and 27 which project into the respective wells 21 and 24 defining respective spaces 28 of limited transverse dimensions.

The wells 20 and 21, as well as the wells 23 and 24 are in fluid communication with one another by means of respective ducts 29. The wells 21 and 22 as well as the wells 24 and 25 are in fluid communication by means of ducts 30.

The ducts 29 and 30 are produced by drilling along two intersecting axes.

The well 22 is put into fluid communication with the well 25 by means of a conventional duct, not shown, and the well 23 is put into communication, by means of a further duct, not shown, with a threaded hole 31, opening into the inner side of the side portion 3. The connector 19 is screwed into the threaded hole 31 on the outside of the caliper. A threaded hole 32 is formed in the cover 20b. This hole 32 which, in practice, is on the outside of the caliper in the same manner as the threaded hole 31, houses the connector 18 which is screwed therein.

It is clear at this point that the circuit 16 for the cooling liquid is constituted by the spaces 28 formed by the covers 20b–25b with the ends of the respective wells 20–25, by the ducts 29 and 30, and by the transverse connecting ducts (not shown) which put the well 22 into communication with the well 25 and the well 23 into communication with the threaded hole 31.

All of the covers 20b–25b are made of aluminium. The appendages 26 and 27 formed integrally with the respective covers 21b and 24b are also made of aluminium.

In operation, the cooling fluid which passes along the path 17 of the circuit 16 flows through the ducts, close to the cylinder-piston units, ensuring that the temperature of the braking fluid is kept below its boiling points.

Figure 5:
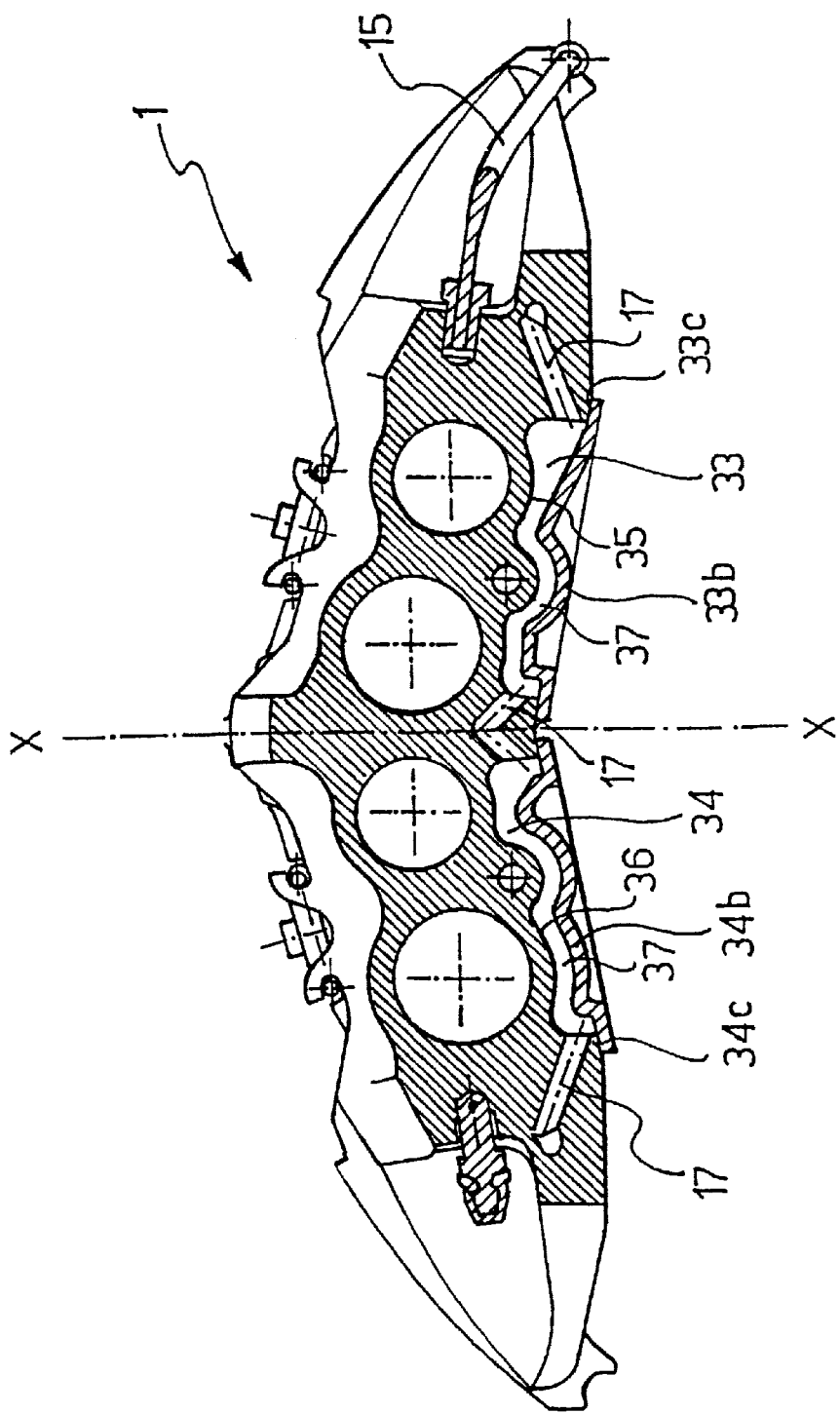
FIG. 5 is a shows a variant of the caliper of the preceding drawings, in longitudinal section.
Figure 6:
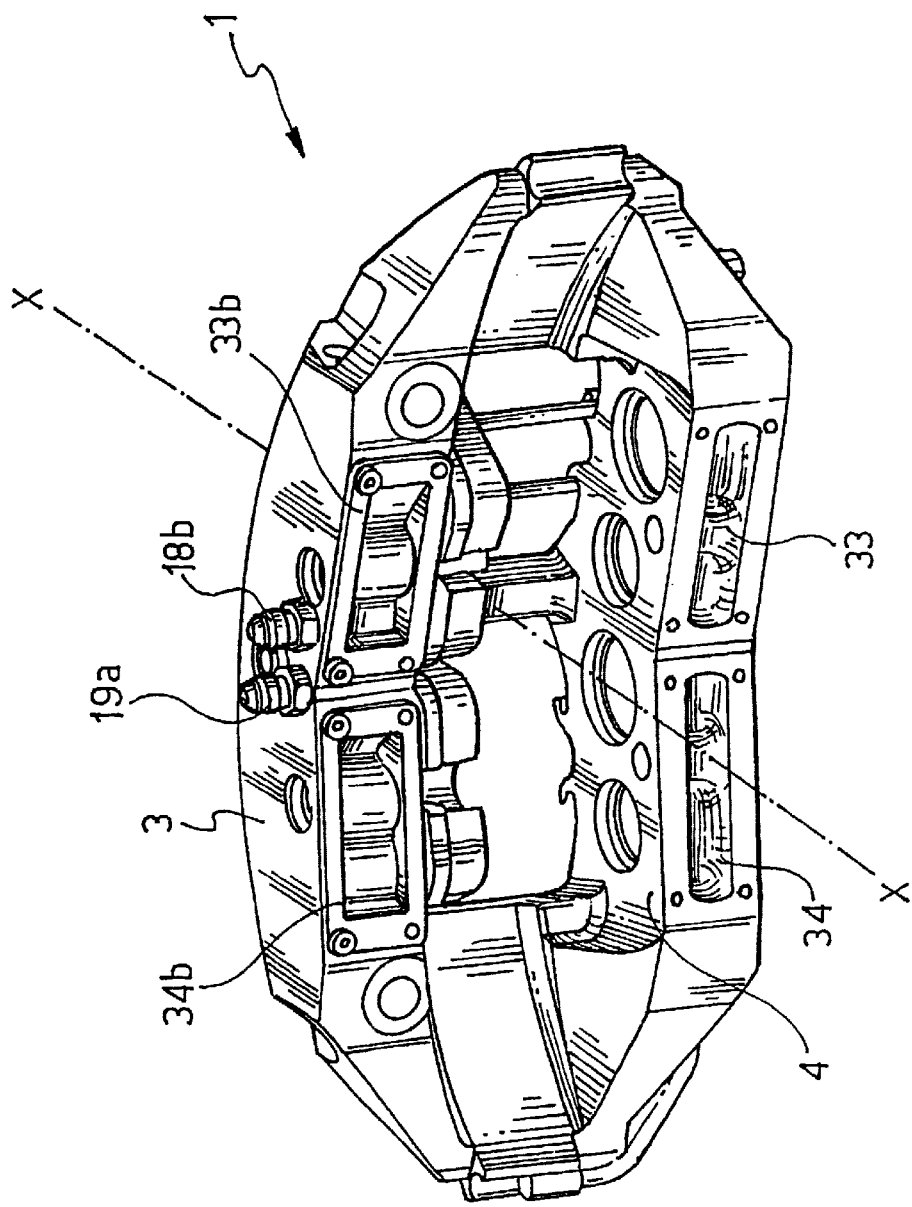
FIG. 6 is a perspective view of the caliper of FIG. 5, taken from below.

With reference to the embodiment of FIGS. 5 and 6, it will be noted that the circuit for the fluid for cooling the cylinder-piston units comprises, for each side portion 3 and 4, two wells, indicated 33 and 34, closed by respective covers 33b and 34b with seals 33c and 34c. The wells 33 and 34 of the side portion 4 are shown in FIG. 6 without the respective covers. The ends 35 and 36 of the well 33 and of the well 34, respectively, are shaped so as to be close to the peripheral walls of the cylindrical seats of the cylinder-piston units and the respective covers 33b and 34b are shaped, for example, by drawing, so as to reproduce the shapes of the ends 35 and 36. A space 37 formed between the covers 33b and 34b and the ends 35 and 36 of the respective wells constitutes part of the circuit for the cooling fluid.

The connectors 18 and 19 which, in the embodiment of FIGS. 5 and 6, are indicated 18a and 19a, are advantageously positioned in the vicinity of the centreline x—x of the caliper.

The main advantage of the caliper according to the present invention lies in its reliability, as well as in maximum strength.

Naturally, in order to satisfy contingent and specific requirements, an expert in the art may apply to the above-described caliper many modifications and variations all of which, however, are included within the scope of protection of the invention as defined by the following claims.

What is claimed is:

1. A caliper for a disk brake for motorcars, said caliper comprising a body having two side portions and two transverse bridges connecting the two side portions, cylinder-piston units arranged along each side portion, and a circuit with an inlet and an outlet for a fluid for cooling the cylinder-piston units, wherein the circuit for the fluid for cooling the cylinder-piston units comprises wells formed along at least one of the side portions, the wells being of a depth such that they extend to a wall proximate to and delimiting at least one of the cylinder-piston units, the wells being closed by covers, at least one of said covers bearing an appendage extending into a respective well in order to occupy a predominant portion thereof, and the circuit also comprising connecting ducts for putting the wells into fluid communication with one another.

2. The caliper according to claim 1, wherein each of the covers bears an appendage extending into respective wells in order to occupy predominant portions thereof.

3. The caliper according to claim 1, wherein the appendage of said at least one cover comprises a deformation of the cover.

4. The caliper according to claim 1, wherein the covers and the appendage are made of aluminum.

5. The caliper according to claim 1, wherein the body is formed by mechanical machining from a solid semi-finished product made of aluminum alloy, and in that the wells and the ducts are produced by milling and by drilling, respectively.

6. The caliper according to claim 1, wherein said circuit for the fluid for cooling the cylinder-piston units comprises wells formed along both of said side portions.

7. The A caliper according to claim 1, wherein portions of boundaries defining said wells concentrically follow a periphery of said cylinder-piston units.

8. The caliper according to claim 1, wherein said at least one of said covers bearing said appendage is adapted such that said appendage follows the contour of a boundary defining said respective well.

9. The caliper according to claim 1, comprising four of said cylinder-piston units on each side portion.

10. The caliper according to claim 1, wherein at least one of said wells extend into a space located substantially between adjacent ones of said cylinder-piston units.

11. The caliper according to claim 1, comprising three of said covers on each side portion, and wherein a middle one of said three covers on each side portion bears an appendage extending into a corresponding well in order to occupy a predominant portion of said corresponding well.

12. A caliper for a disk brake suitable for automobiles, said caliper comprising a body having two side portions and two transverse bridges connecting the two side portions with cylinder-piston units arranged along each side portion, and a circuit with an inlet and an outlet where said circuit is adapted to carry a fluid for cooling said cylinder-piston units, wherein said circuit comprises wells formed along at least one of said side portions, said wells being of a depth from a surface of said side portions such that said wells are at least partially defined by an inner wall, said inner wall being proximate to at least one of the cylinder-piston units and being substantially concentric to said proximate cylinder-piston unit, said circuit comprising ducts for putting said wells into fluid communication with one another, and wherein said wells are sealed closed with covers with at least one of the covers bearing an appendage extending into a corresponding well in order to occupy a portion thereof.

13. The caliper according to claim 12, wherein said appendage is shaped to complement said inner wall.

14. The caliper according to claim 12, wherein each of the covers bears an appendage extending into a corresponding well in order to occupy a portion thereof.

15. The caliper according to claim 14, wherein said appendages are shaped to complement said inner wall.

16. The caliper according to claim 12, wherein at least one of said wells extend into a space located substantially between adjacent ones of said cylinder-piston units.

17. The caliper according to claim 16, wherein said at least one well extending into said space has two inner walls, each wall corresponding to one of an adjacent pair of cylinder-piston units such that said well is substantially cusp-shaped.

18. A caliper for a disk brake for motorcars, said caliper comprising a body having two side portions and two transverse bridges connecting the two side portions, cylinder-piston units arranged along each side portion, and a circuit with an inlet and an outlet for a fluid for cooling the cylinder-piston units, wherein the circuit for the fluid for cooling the cylinder-piston units comprises wells formed along at least one of the side portions, the wells being of a depth such that they extend substantially as far as the vicinity of one or more walls delimiting at least one seat of the cylinder-piston units, at least one well having a space fitted between adjacent cylinder-piston units, and the wells being closed by covers, at least one of the covers bearing an appendage extending into a corresponding well in order to occupy a predominant portion thereof, and wherein the circuit also comprising connecting ducts for putting the wells into fluid communication with one another.

19. The caliper according to claim 18, wherein said at least one well extending having said space is partially defined by two inner walls, each wall corresponding to one of an adjacent pair of cylinder-piston units such that said well is substantially cusp-shaped.

20. The caliper according to claim 18, wherein said appendage is shaped to complement said one or more walls.

* * * * *